Oct. 30, 1956     C. E. WALLER     2,768,478
PATTERN CONTROLLED CUTTER GRINDER
Filed May 31, 1955     6 Sheets-Sheet 6

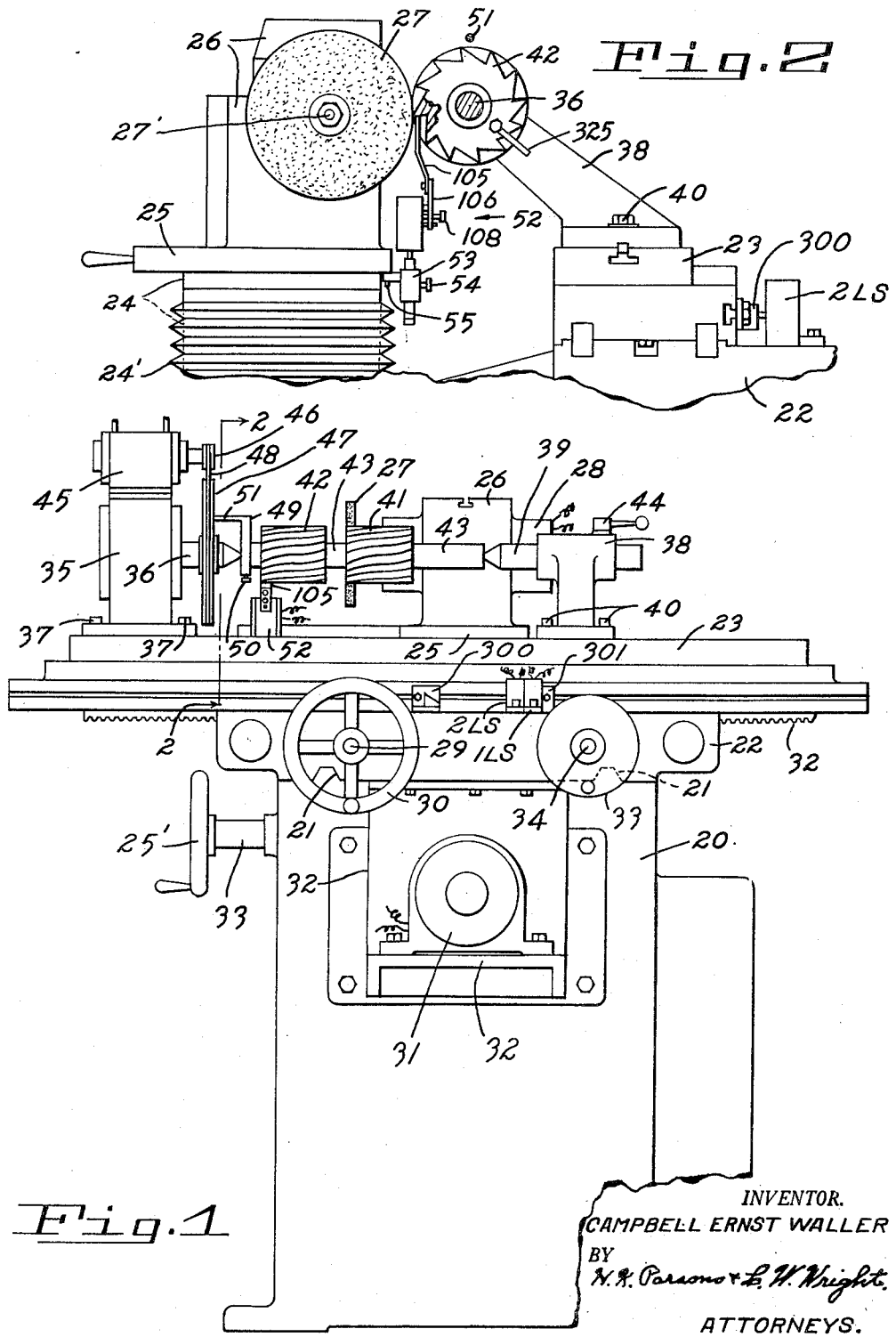

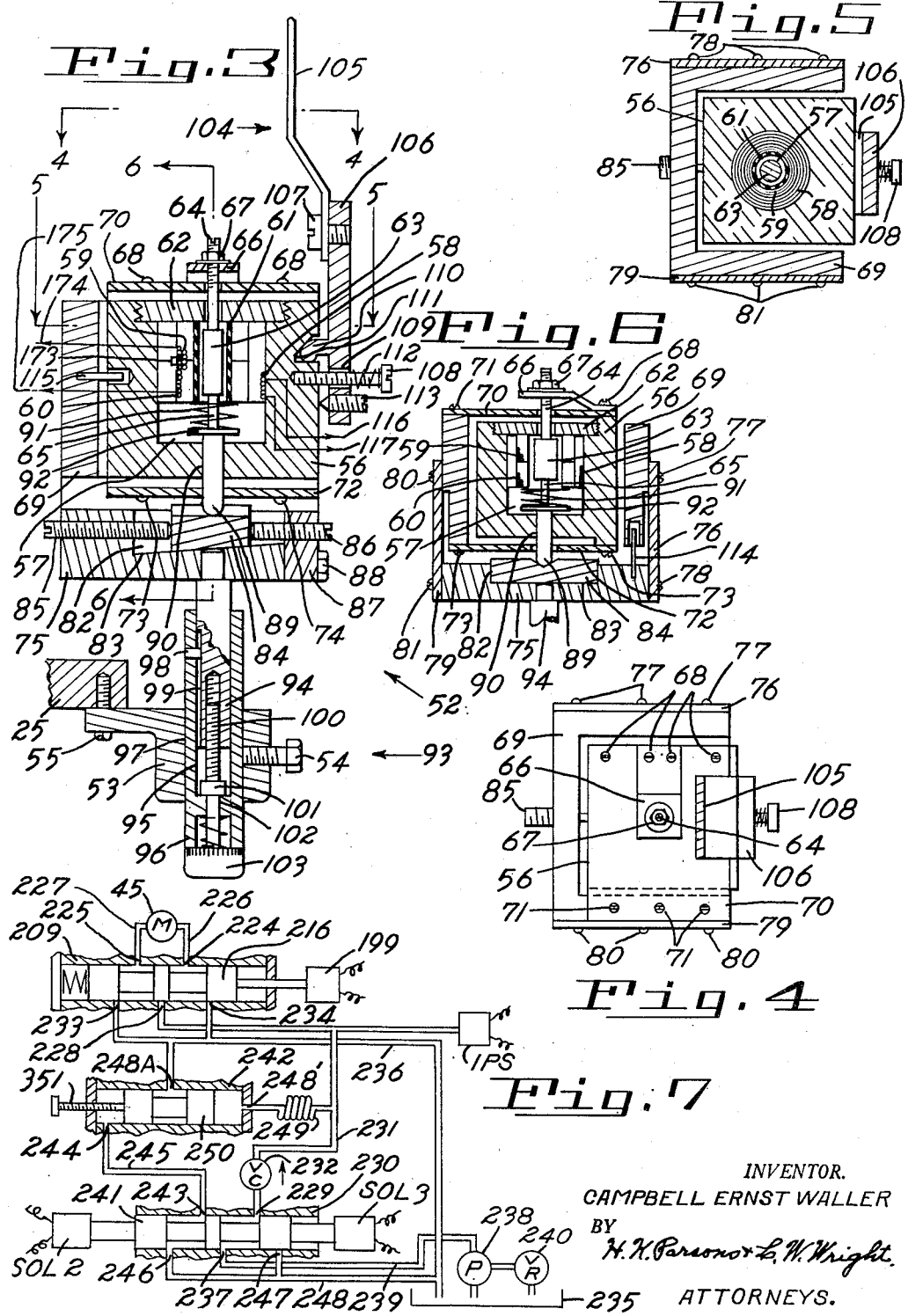

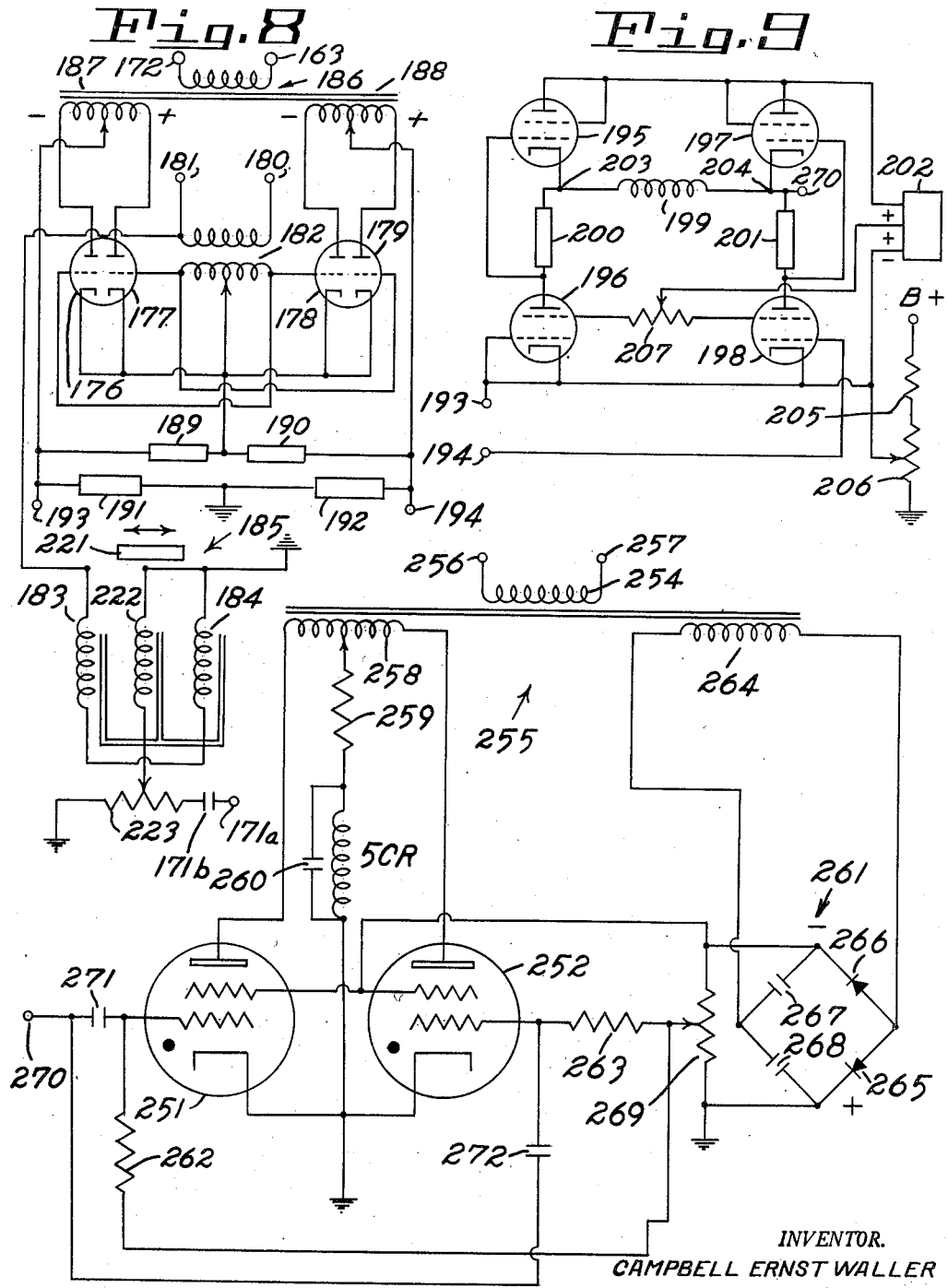

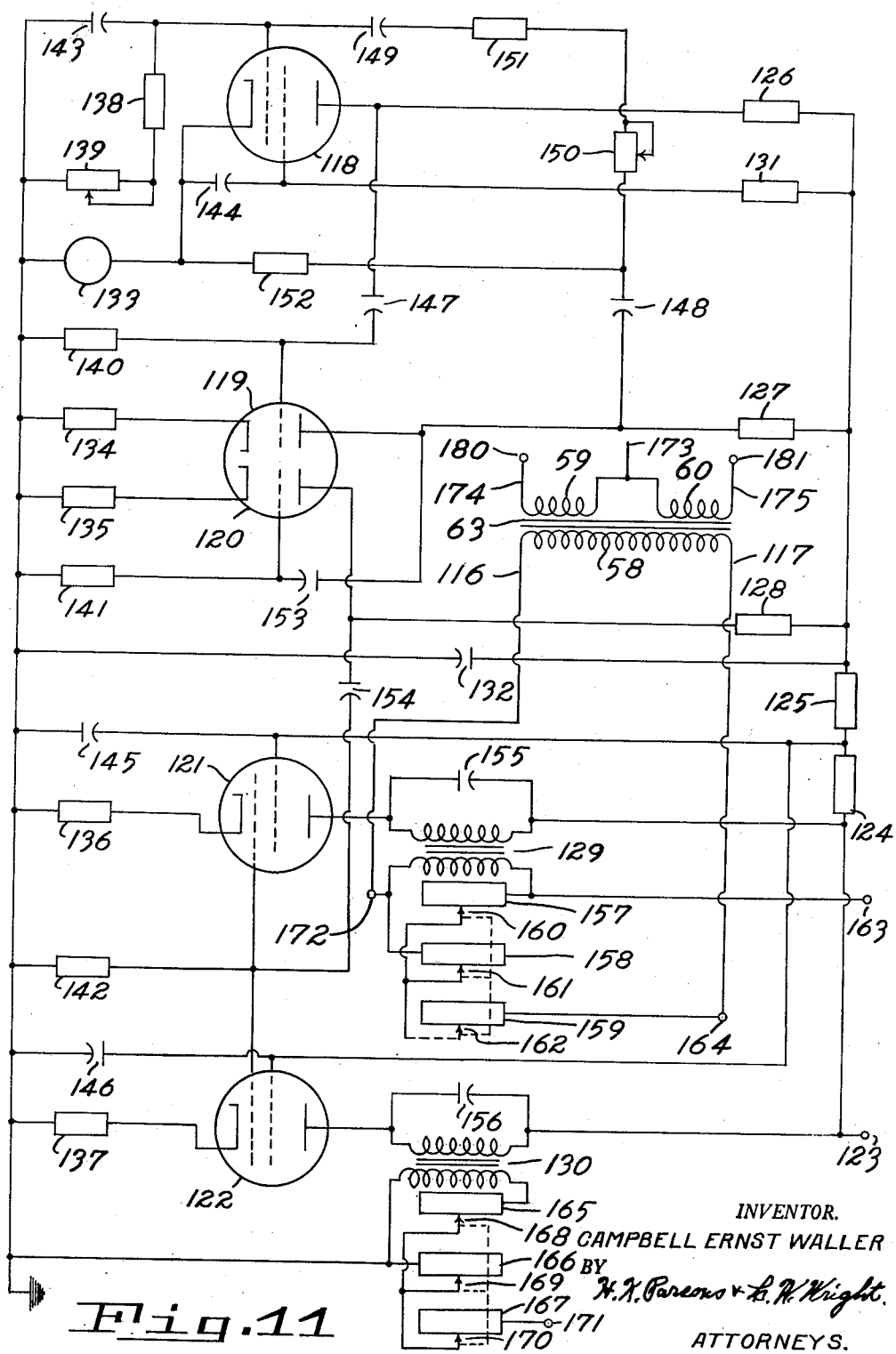

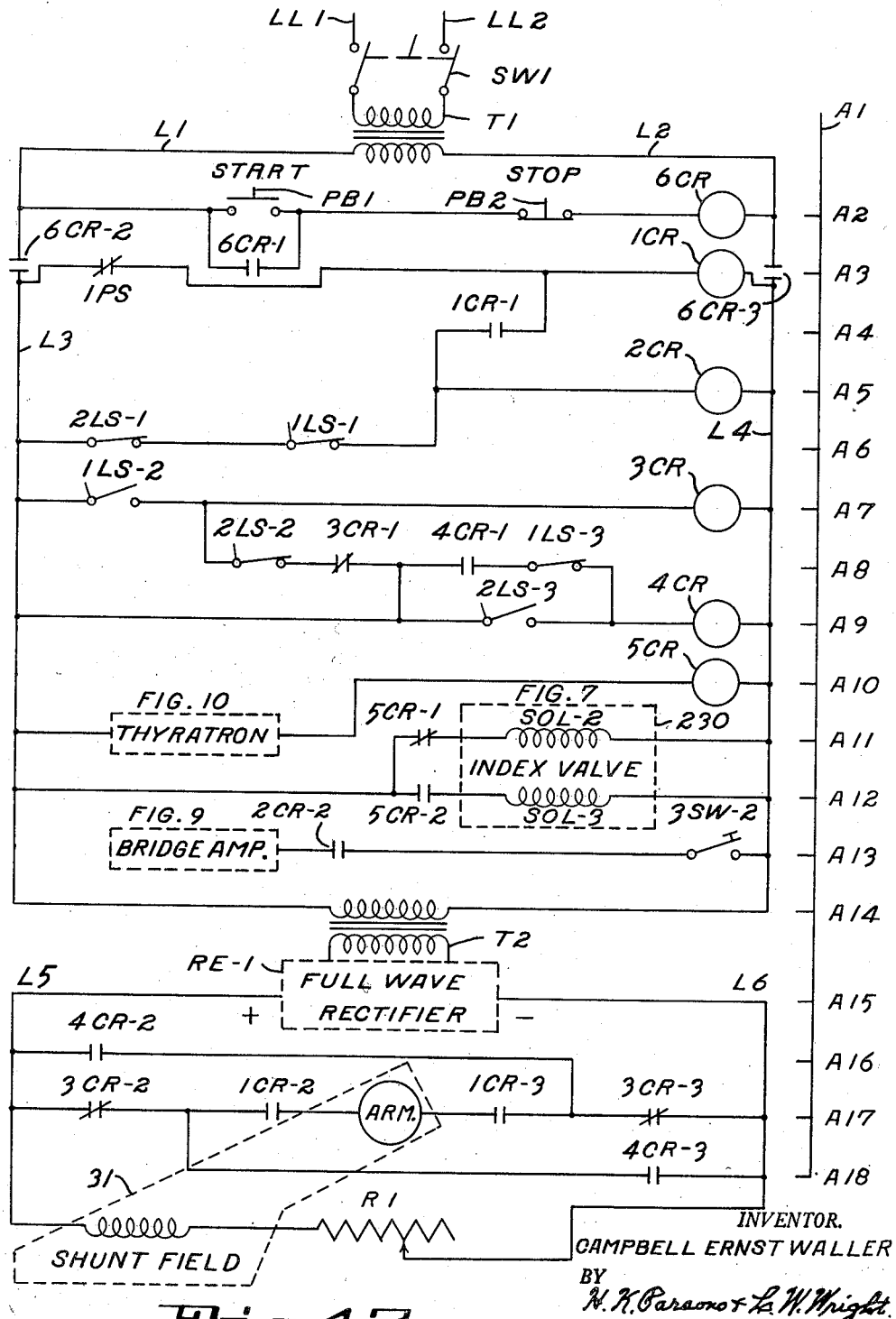

INVENTOR.
CAMPBELL ERNST WALLER
BY
ATTORNEYS.

United States Patent Office 2,768,478
Patented Oct. 30, 1956

2,768,478

PATTERN CONTROLLED CUTTER GRINDER

Campbell Ernst Waller, Cincinnati, Ohio, assignor to The Cincinnati Milling Machine Co., Cincinnati, Ohio, a corporation of Ohio Application May 31, 1955, Serial No. 511,839

16 Claims. (Cl. 51—100)

This invention relates to machine tools and more particularly to a pattern controlled cutter grinder.

The prior use of conventional cutter grinders for the grinding of helical type cutters and the like has necessitated the use of many steps of complex manual manipulations such as loading the work into the machine, engaging the cutter tooth with the tooth rest, feeding the grinding wheel to initially "size" the cutter, twisting the cutter to apply constant presure between the tooth and tooth rest so as to follow the helix while the cutter is traversed with respect to the grinding wheel, and finally indexing the cutter to the next tooth; all of which requires the constant attention of a skilled operator.

Therefore, one of the principal objects of this invention is to provide an automatic pattern controlled cutter grinder which will grind all the teeth on a cutter in a complete automatic cycle without the constant attention of a skilled operator.

Another object of this invention is to provide an automatic pattern controlled cutter grinder that is adaptable to automatically grind straight toothed, helical toothed or other non-linear shaped toothed cutters in a complete automatic cycle.

A further object of this invention is to provide an automatic pattern controlled cutter grinder wherein the cutter itself or a separate pattern may be utilized as the pattern means to automatically control the rotatable position of the cutter tooth and maintain it in tangential contact with the grinding wheel throughout the traverse of one relative to the other.

Still another object of the invention is to provide an automatic pattern controlled cutter grinder in which the rotatable position of the cutter edge with respect to the grinding wheel is determined by a sole prime mover, the rotatable position of which is automatically controlled by a tracer finger with the prime mover and biased to maintain a tooth in constant pressural contact with the tracing finger.

And still another object of this invention is to provide an automatic pattern controlled cutter grinder which is relatively simple, troublefree, highly accurate, easy to operate, and having a short initial set-up time for a single grinding operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the accompanying drawings in which like reference characters denote like or similar parts throughout the several views:

Figure 1 is a front elevation view of the basic machine incorporating a preferred embodiment of the invention.

Figure 2 is a diagrammatic sectional view showing the relative position of the cutter, grinding wheel, and tracing finger mechanism as viewed along the line 2—2 of Figure 1.

Figure 3 is a cut-away view of the tracing finger mechanism shown in Figure 2.

Figure 4 is an end elevation view of the tracing finger mechanism as viewed along the line 4—4 of Figure 3.

Figure 5 is a diagrammatic sectional view of the tracing finger mechanism as viewed along the line 5—5 of Figure 3.

Figure 6 is a diagrammatic sectional view of the tracing finger mechanism as viewed along the line 6—6 of Figure 3.

Figure 7 is a diagrammatic view of the associated hydraulic circuitry for the machine.

Figure 8 is an elementary electrical schematic diagram of the phase-sensitive rectifier circuitry.

Figure 9 is an elementary electrical schematic diagram of the D. C. bridge-amplifier electrical circuitry.

Figure 10 is an elementary electrical schematic diagram of the thyratron circuitry.

Figure 11 is an elementary electrical schematic diagram of the oscillator circuitry.

Figure 12 is a diagrammatic view of the associated electrical control circuitry.

Figure 13:
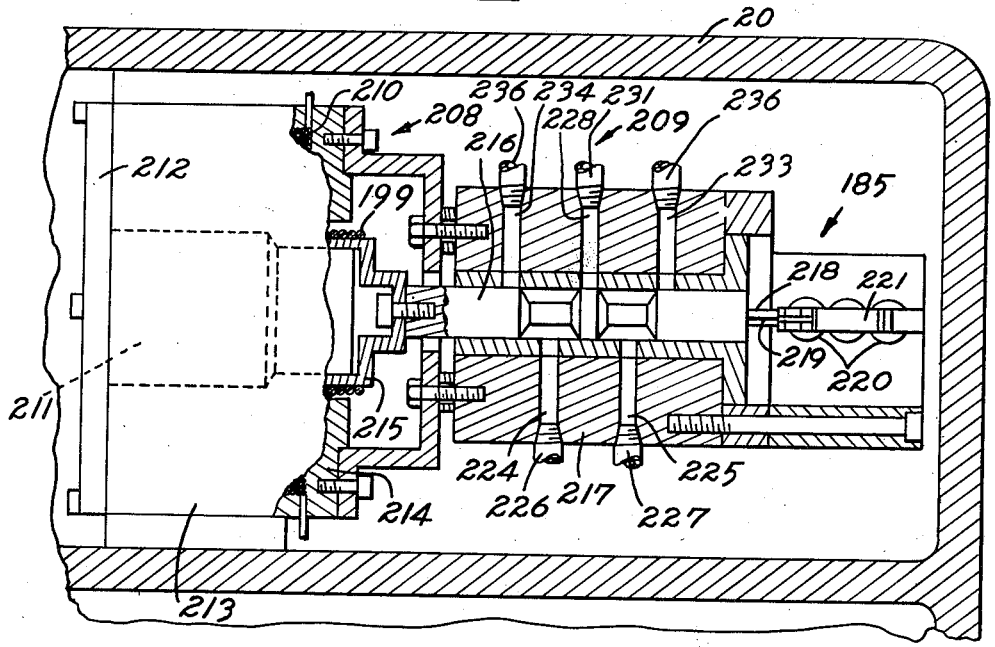
Figure 13 is a diagrammatic sectional view of the electro-hydraulic transducer mechanism.
Figure 14:
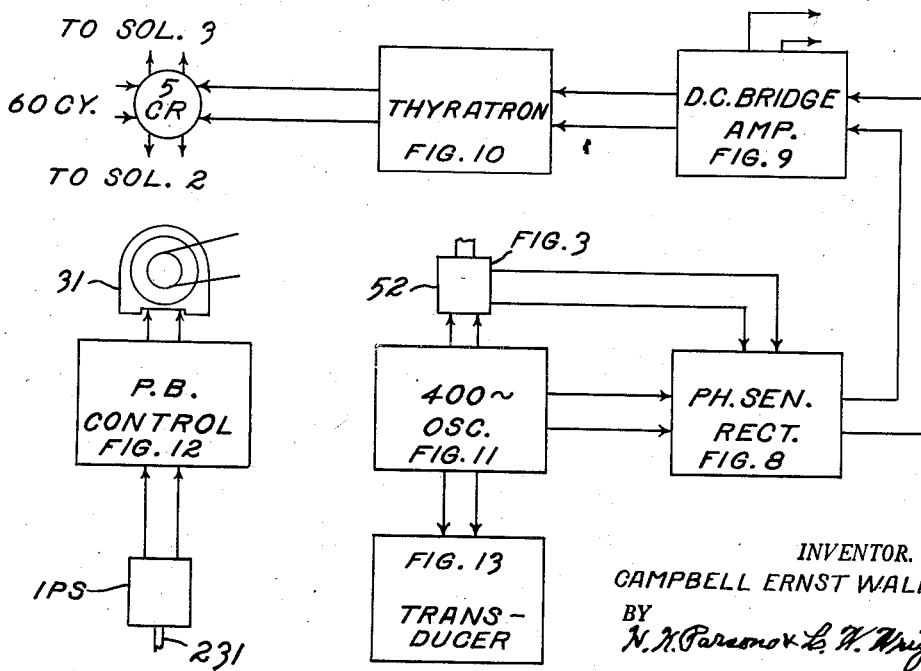
Figure 14 is an elementary block diagram showing the relationship of the electrical circuitry employed.

The sharpening and/or grinding operation on cutters used in the metal working industry has been in the past almost wholly a manual operation. This invention deals with a machine for performing this operation automatically. It is obvious that the cutting edge of a cutter, whether straight, curved or profiled, must be held in a predetermined tangential relation to the grinding wheel in order to be sharpened, not only throughout the longitudinal traverse of the edge relative to the wheel, but each succeeding tooth must also be held in the same position, so that all the edges lie in a surface of revolution concentric with the axis of the cutter.

In this invention, the combination of a toothed pattern and a sensitive tracer have been provided which serve as the positioning means to locate the cutting edge in proper grinding relation to the grinding wheel, and a reversible torque motor is provided for (1) to maintain a constant rotatable urge to maintain pressural engagement between the tracer and pattern so that the one accurately follows the other during grinding, and (2) to impart a rotatable indexing movement to the cutter and pattern after each tooth has been ground.

In the control circuit, a sensitive electrical pick-up is operatively connected to the tracer finger to produce a signal upon departure of the finger from a null position, and this signal by means of an oscillator circuit is transformed into an A. C. signal having phase and amplitude characteristics. By means of a phase sensitive rectifier circuit this last signal is then converted into a push-pull D. C. error signal and applied to a power bridge amplifier circuit which by means of a transducer mechanism controls reversible operation of the torque motor.

*Machine structure*

This invention has been embodied in a machine, shown in Figure 1 of the drawings, which consists essentially of a bed 20 having spaced longitudinal guideways 21 formed thereon for supporting and guiding a movable saddle 22. A work table 23 is reciprocably mounted on the ways of saddle 22 by suitable anti-friction bearings, such as shown in United States Letters Patent 1,975,947, granted to Herman R. Isler and Sol Einstein on October 9, 1934.

As shown in the patent, a tubular guide sleeve or column

24, Figure 2, having a protective shroud 24' thereabout, is adjustably mounted in a tubular guide, not shown, formed in the bed 20 for vertical adjustment by a handwheel 25' and has mounted on the top thereof a plate member 25 supporting a head 26. A spindle 27' is journaled in the head 26 and projects from the left side thereof for receiving a grinding wheel 27. The column 24 may be vertically adjusted up and down for varying the height of the grinding wheel 27 with respect to the work, and, in addition, the column 24 may also be rotated to change the axis of the grinding wheel 27 angularly with respect to the movement of the table 23, all in a well known manner. A first prime mover such as an electric motor or the like, not shown, is mounted in the head 26 in any conventional manner for imparting rotation to the grinding wheel 27.

A cross feed screw 29 is journaled in the saddle 22 in threaded engagement with a nut, not shown, affixed to the bed 20 in any conventional manner. A handwheel 30 is attached to the end of the screw 29 whereby the saddle 22 and table 23 may be adjusted toward and from the grinding wheel 27. By this means, the work may be fed into the grinding wheel 27 as in cylindrical grinding operation.

The transmission for reciprocating the table may be the same as that shown in the patent supra with the exception that no reversing clutch is necessary, reversing being effected in this embodiment by directly reversing the electric motor 31 which drives the transmission. This motor may be mounted in the same manner as in the patent as shown in Figure 1 of the drawings herein, in which a depending housing 32 supported on the underside of the saddle carries the motor. Thus, the motor and transmission are adjustable crosswise with the saddle. Manual adjustment of the table may be effected by the handwheel 33 mounted on the shaft 34 which may be operatively connected to the table transmission in the same manner as shown in the patent.

A headstock 35, having a suitable work spindle 36 journaled therein, is attached to one end of the table 23 by suitable T-bolts 37. A tailstock 38, having a suitable work spindle 39, is adjustably mounted on the other end of the table 23 by suitable T-bolts 40. A workpiece 41, such as a cutter to be ground, and a suitable pattern 42 are mounted on a common arbor 43 having center holes formed in either end thereof. The arbor 43 is adapted to be mounted between the spindles 36 and 39 by proper adjustment of the tailstock 38 which is then locked in adjusted position by the clamp 44.

A third prime mover 45, such as a hydraulic motor or the like, is suitably mounted on the headstock 35 and operatively connected to the work driver or spindle 36 through suitable pulleys 46 and 47 and connecting belt 48 for rotating the work. A driving dog 49 is mounted on the arbor 43 and locked thereto by a bolt 50 threaded therein; the said dog 49 having a tail extension 51 in engagement with the pulley 47 by conventional slots formed therein, all of which constitute means to convert rotational movement of the output shaft of the prime mover 45 into synchronized rotational movement of the work 41 and the pattern 42.

Tracing finger mechanism

The pattern 42 is, of course, an exact duplicate of the cutter to be ground in that it has the same number of teeth, and each pattern tooth is straight or helical the same as the work. A tracer finger is mounted in a fixed position so that upon engagement with a tooth face of the pattern, the cutter will be rotatably positioned with respect to the grinding wheel to place the tooth to be ground in the proper grinding relation to the grinding wheel, and since the tracer finger is mounted on the bed, the table and pattern may be traversed relative to the finger to scan the length of the pattern and cause rotation of the pattern and work if such is necessary because of the helical or angular nature of the tooth being followed.

A tracing finger mechanism, shown in Figures 1 and 2, and indicated generally by the reference numeral 52, is adjustably mounted in a holder 53 by a lock nut 54, said holder 53 in turn being mounted on the lower side of the plate 25 by bolts 55 threaded therein.

With reference to Figure 3 of the drawings, the tracing finger mechanism 52 comprises a non-magnetic and somewhat cubically shaped block member 56 having a vertical bore or cavity 57 formed therein. A primary winding 58 concentric with dual secondary windings 59 and 60, constituting the elements of a "linearly variable differential transformer" or the like, is formed about a conventional coil form 61 and pressed into the topmost portion of the bore 57 and secured therein by a non-magnetic plate member 62 secured thereabove in any conventional manner. A movable powdered iron core or the like 63 having vertical non-magnetic extensions 64 and 65 extending from either end thereof is positioned within the coil form 61 of the said differential transformer.

The core extension 64 passes freely through a hole in a first strip spring member 66, Figure 6, and is provided with an adjustable locknut 67 threaded thereon. The said spring member 66 is secured to the said mounting block 56 by bolts 68 threaded therein. The said mounting block 56 is suspended in a rectangular box-like mounting member 69 for movement relative thereto through a reed type suspension consisting of an upper horizontally disposed strip spring member 70 secured thereto by bolts 68 and 71 threaded therein respectively, and a lower horizontally disposed strip spring member 72 secured thereto by bolts 73 and 74 threaded therein respectively.

The mounting member 69 is connected to a rectangular platelike mounting member 75 through a second reed type suspension consisting of a first vertically disposed strip spring member 76 secured thereto by bolts 77 and 78 threaded therein respectively, and a second vertically disposed strip spring member 79 secured therein by bolts 80 and 81 threaded therein respectively. A centrally disposed bore or cavity 82 having a sloped face 83 is formed in the member 75, Figure 3.

A V block 84 is provided and is slidably mounted in the bore 82 and may be position-adjusted by action of screws 85 and 86 threaded in the member 75 and a plate 87, respectively, which is secured to the member 75 by bolt 88 threaded therein. A rod or shaft 89 having a rounded end in contact with the slot in the said V block 84 is slidably mounted in a bore 90 formed in the block 56 and is connected to said extension 65 of the core 63 in any conventional manner. A spring 91 is positioned about the extension 65 and interposed between the said differential transformer and a collar 92 formed on the rod 89.

Therefore, it can be seen that the core 63 of the said differential transformer may be positioned and centrally disposed with respect to the said secondaries 59 and 60 respectively by proper adjustment of the tension exerted by the spring 66 to equal the tension exerted by the spring 91 and may be considered, in a sense, suspended in that position. Normally, the spring 91 tends to force the core 63 downward in an unbiased position, i. e., below neutral but the position of the V block 84 may be adjusted by the screws 85 and 86 to hold the core 63 in a normally centrally disposed or "null" condition.

In addition, a vernier adjustment mechanism 93 has been provided to raise or lower the tracing finger mechanism 52 and thus determine the grinding position of the cutter tooth with respect to the grinding wheel. Such a vernier adjustment mechanism 93 consists essentially of a shaft or post 94 secured to the plate 75 in any conventional manner and slidably mounted in a bore 95 formed in a micrometer post or housing 96. The said micrometer post 96 is slidably mounted in a bore 97 formed in the said bracket 53 and locked thereto by action of bolt 54 threaded therein. Rotational movement of the shaft 94 is prevented by action of a key 98 formed in the post 96 riding in a keyway 99 formed along the shaft 94.

A bolt 100 is threaded into the lower end of the shaft 94 and is rotatably mounted in a second bore 102 formed in the post 96 and downward movement thereof is prevented by action of a collar 101 formed thereon. A calibrated control knob 103 is provided and connected to the extending end of bolt 100 in such a manner that it now becomes evident that the tracing finger mechanism 52 may be raised or lowered in incremental adjustment by proper rotation of the control knob 103.

A "clapper type" finger or stylus mechanism 104, Figure 3, has been devised and consists essentially of a finger member 105 connected to an arm member 106 by action of a bolt 107 threaded therein. The said arm 106 is pivotable about a bolt 108 which is mounted in an oversized bore 109 formed in the arm 106 and threaded in the block 56. A cylindrical like extension 110 formed on the arm 106 normally engages a parallel disposed slot 111 formed along the side of the block 56 such that it can be seen that vertical deflection of the finger 105 will cause vertical movement of the block 56 and, in addition, the extension 110 and slot 111 also prevents rotational movement of the stylus mechanism 104 with respect to the block 56.

A spring 112 is positioned about the bolt 108 and interposed between the arm 106 and the head of said bolt 108 to maintain the extension 110 in engagement with the slot 111. An adjustment screw 113 is provided and is threaded in the arm 106 in engagement with the block 56 to give the so-called "clapper action" of the finger 105 when the said finger is deflected to the left or to the right, as viewed in Figure 3, during indexing due to the difference in diameters of the bolt 108 and hole 109, as will later be seen. If the tracing finger 105 is deflected laterally, i. e., up or down as viewed in Figure 4, the block 56 will be moved downward, as viewed in Figure 3, which will result in vertical movement of the transformer secondaries 59 and 60 relative to the core 63.

Thus, it can now be seen that vertical deflection or motion of the tracer finger 105, or lateral motion of the finger 105 moves the differential transformer secondaries 59 and 60 relative to the core, whereas horizontal force against the front or back face of the finger 105 causes "clapper" action in order to index the cutter 41 and pattern 42 after each machining cycle is completed.

For adjustment purposes, the side deflectional force on the finger 105 is proportioned by the tension on the strip spring 66 by adjustment of the locknut 67, and the tension of the coil spring 91 plus the spring action of the strip springs 70 and 72. The position of the core 63 is adjusted to an unbiased condition by shifting the V block 84 along the sloped surface 83 of the slot 82 by adjustment of the screws 85 and 86 or by turning the micrometer knob 103. For safety purposes, the vertical and horizontal deflection of the finger 105 is limited by action of pins 114 and 115 respectively formed on the plate 75 and mounting member 69.

Oscillator

Excitation means have been provided to energize the primary winding 58 of the differential transformer shown in Figure 3, through its input leads 116 and 117, from a source of alternating energy by means of an oscillator circuit shown in Figure 11. The said excitation means consists essentially of a conventional 400 cycle "wein bridge" type vacuum tube oscillator-amplifier having vacuum tubes 118, 119, 120, 121 and 122 connected together as shown in Figure 11.

A D. C. plate supply voltage or B plus voltage is supplied to the input terminal 123 of said circuit from a D. C. source not shown. The said D C. plate supply voltage is: (1) supplied to the plate of tube 118 through series dropping resistors 124 and 125, and a plate dropping resistor 126 connected therebetween; (2) supplied to the plate of tube 119 through series dropping resistors 124 and 125 and a plate dropping resistor 127 connected therebetween; (3) supplied to the plate of tube 120 through the series dropping resistors 124 and 125 and a plate dropping resistor 128 connected therebetween; (4) supplied to the plate of tube 121 through the primary winding of a transformer 129 connected therebetween; and (5) supplied to the plate of tube 122 through the primary winding of a transformer 130 connected therebetween.

The D. C. plate supply voltage is also supplied to the screen grid of tube 118 through the resistors 124 and 125 and a screen dropping resistor 131 connected therebetween and is supplied to the screen grids of tubes 121 and 122 respectively through the common series dropping resistor 124 connected therebetween. The said input terminal 123 is A. C. bypassed to ground potential through a suitable bypass condenser 132.

The cathodes of the tubes 118, 119, 120, 121 and 122 are returned to ground potential through a light bulb 133, a cathode resistor 134, a cathode resistor 135, a cathode resistor 136, and a cathode resistor 137 respectively connected therebetween.

The control grids of the tubes 118, 119, 120, 121, and 122 are returned to ground potential through series connected grid resistors 138 and 139, a grid resistor 140, a grid resistor 141, and common grid resistor 142, respectively connected therebetween. The control grid of the tube 118 is A. C. bypassed to ground potential through a grid bypass condenser 143 connected therebetween. The screen grids of the tubes 118, 121, and 122 are A. C. bypassed to ground potential through a screen bypass condenser 144, a screen bypass condenser 145, and a screen bypass condenser 146 respectively connected therebetween.

The tubes 118 and 119 constitute elements of a conventional "wein bridge" type vacuum tube oscillator wherein the A. C. output from the plate of the tube 118 is fed to the control grid of the tube 119 through a coupling condenser 147 connected therebetween. The A. C. output from the tube 119 in turn is fed to the control grid of the tube 118 through coupling condensers 148 and 149 and resistors 150 and 151 series connected therebetween. Therefore the circuit will tend to become unstable and will oscillate at a frequency determined by the time constant of the series connected resistors and condensers 148, 149, 150, and 151 and the time constant of the parallel connected condenser and resistors 138, 139 and 143. Therefore, with proper adjustment of the value of the resistors 139 and 150, the oscillator will oscillate at a constant frequency of 400 C. P. S. and will be stabilized at that frequency by a stabilization resistor 152 connected at the junction of resistor 150 and the condenser 148 and returned to ground potential. The light 133 between the cathode of the tube 118 and ground potential will be illuminated, thus indicating proper functioning of the aforementioned oscillator.

The 400 C. P. S. output from the plate of the tube 119 is also fed to the control grid of the tube 120 through a coupling condenser 153 and is thus amplified therein. The 400 C. P. S. output from the plate of the amplifier tube 120 is fed simultaneously to the control grids of the tubes 121 and 122 respectively through a coupling condenser 154 connected therebetween for further amplification purposes. The amplified 400 C. P. S. voltage will appear across the plate load primary windings of the transformers 129 and 130 respectively which are tuned to a parallel resonant frequency of 400 C. P. S. by parallel connected condensers 155 and 156 respectively.

The secondary winding of the transformer 129 has parallel connected thereacross a conventional T pad network consisting of resistors 157, 158, and 159 having their centertaps or slider arms 160, 161, and 162, respectively, mechanically coupled together. Therefore, the 400 C. P. S. voltage appearing at the output terminal 163 connected to the end of the resistor 157, will remain constant relative to output terminal 172, whereas the 400 C. P. S. voltage appearing at the output terminal 164, connected to the end of the resistor 154 will vary relative to terminal 172 in accordance with variations of the position of the slider arms 160, 161, and 162 of the resistors 157, 158 and 159 respectively.

The secondary winding of the transformer 130 has parallel connected thereacross a second conventional T pad network consisting of resistors 165, 166, and 167 having their centertaps or slider arms 168, 169, 170, respectively, mechanically coupled together. Therefore, the 400 C. P. S. voltage appearing at the output terminal 171, connected to the end of the resistor 167, will be adjustable and will vary, relative to ground potential, in accordance with variations of the position of the slider arms 168, 169, and 170 of the resistors 165, 166, and 167 respectively.

The 400 C. P. S. voltage appearing across the output terminals 164 and 172 of the aforementioned oscillator, Figure 11, is connected to the input leads 116 and 117 respectively of the primary winding of the said differential transformer, Figure 3, and thus the said primary winding 58 is energized thereby. The secondary windings 59 and 60 are connected in series phase opposition by a jumper 173 connected therebetween in such a manner that the 400 C. P. S. voltage as appearing across the output leads 174 and 175 will be zero when the core 63 is positioned at a "null" or central position with respect to the said secondaries 59 and 60. Thus, if said core 63 is relatively moved to either side of the null position by deflection of the tracing finger 105, the 400 C. P. S. output voltage appearing across the secondary winding leads 174 and 175 will either be in-phase with or 180 degrees out of phase with the 400 C. P. S. voltage appearing across the primary winding input leads 116 and 117, thus indicative of relative direction of movement of the core 63 from its null position. The magnitude of the said voltage across the secondary winding leads 174 and 175 will be directly proportional to the degree or amount of movement of the core 63 from its null position and said voltage will be known hereafter as the "A. C. error voltage." Therefore, the tracing finger mechanism 52, energized by the 400 C. P. S. source, Figure 11, constitutes means for converting linear movement of the tracing finger 105 into an electrical signal having phase and amplitude characteristics, indicative and proportional to the direction and degree of deflection of the said tracing finger 105.

*Phase sensitive rectifier*

Means have been provided whereby the said A. C. error signal is converted into a push-pull D. C. error voltage. With reference to Figure 8 of the drawings, the said conversion means consists essentially of a conventional phase-sensitive rectifier circuit having four vacuum tubes 176, 177, 178, and 179 contained therein. The tubes 176 and 177 and the tubes 178 and 179, respectively, are shown contained in a common envelope being conventional dual-triode vacuum tubes as are well-known and available on the market. The output leads 174 and 175 of the aforementioned differential transformer, Figure 3, are connected to the input terminals 180 and 181, Figure 8, of the sensitive rectifier circuit. The terminal 180 is connected to one end of the primary winding of a center tapped transformer 182 whereas the remaining terminal 181 is connected to the other end of the primary winding and is returned to ground potential through secondary windings 183 and 184 of a variable differential transformer 185. The ends of the secondary winding of the transformer 182 are connected to the control grids of the vacuum tubes 177 and 178.

The control grids of the vacuum tubes 176, 177, 178, and 179 are cross-connected, that is, the control grid of the tube 176 is connected to the control grid of the tube 178 while the control grid of the tube 177 is connected to the control grid of the tube 179. The center tap of the secondary winding of the transformer 182 is connected to the cathodes of the said tubes 176, 177, 178, and 179 having a common connection therebetween. The plates of the tubes 176, 177, 178, and 179 are driven in phased opposition by an alternating reference voltage derived from the aforementioned and described oscillator, Figure 11, whose output terminals 163 and 172 are connected to the primary of the transformer 186. Therefore, two center tapped secondary windings 187 and 188 are provided for the transformer 186 for driving the plates of the aforementioned tubes.

The opposite ends of the two secondary windings 187 and 188 of the transformer 186 are connected to the plates of their respective tubes so as to drive these plates 180 degrees out of phase with respect to the other. Also, as shown, the center tap of a secondary winding 187 is connected with the cathodes of the said tubes through a resistor 189 and in like manner, the center tap of a secondary winding 188 is connected to the cathode of the said tubes through a similar resistor 190. The center taps of the secondaries 187 and 188 are also connected to ground potential through resistors 191 and 192 respectively. The secondaries 187 and 188 should be connected so that the plates of the tubes 176 and 179 are both of the same polarity, while the plates of the tubes 177 and 178 are likewise of the same polarity.

The circuit illustrated in Figure 8 is effective to produce a rectified voltage having a magnitude corresponding to the amplitude of the A. C. error voltage appearing across the input terminals 180 and 181 and having a polarity corresponding to the phase of said error voltage. To understand the operation of the phase sensitive rectifier let it be assumed that the control grid of the tube 176 is driven positive by a signal voltage of large amplitude at the same time that the plate swings positive. Under these circumstances the tube 176 will conduct and cause a voltage drop to occur across the resistor 189 with the right hand end of the resistor positive and the left hand end of the resistor negative. However, neither of the tubes 177 and 178 will conduct since the plates thereof are negative, and the tube 179 will be unable to conduct since its grid is negative.

Now, consider the conditions which exist during the next half cycle. The control grid of the tube 177 will now be positive and the plates of the tubes 177 and 178 will be positive. Hence the tube 177 will conduct since the control grid thereof will be positive due to its connection with the control grid of tube 179. Again, a voltage drop will be produced across the resistor 189 in the same direction as before. None of the other tubes 176, 178 or 179 will be conductive since the plates of the tubes 176 and 179 are negative, and the grid of the tube 178 is negative. Hence, a full wave rectified voltage will appear across the resistor 189, the left end of the resistor being negative and the right end being positive.

Assume now that the phase of the error voltage applied to the transformer 182 is just the reverse of that previously considered. Now, when the grid of the tube 179 is positive the plate thereof will also be positive so that the tube 179 will conduct. Again, this will be the only tube which is conductive since the plates of the tubes 177 and 178 are negative and the grid of the tube 176 is negative. Hence a voltage drop will be produced across the resistor 190, the cathode end of the resistor being positive and the plate end thereof negative.

During the next half cycle the grid of the tube 178 will be positive as will also the plate thereof. Hence this tube 178 will conduct and cause a voltage drop to occur across the resistor 190 in such a direction that the cathode end of the resistor is positive and the plate end thereof is negative. None of the remaining tubes 176, 177, and 179 will conduct since the plates of the tubes 176 and 179 are negative and the grid of the tube 177 is negative. Thus, a full wave rectified voltage will appear across one of the resistors 189 or 190 when the error voltage, as applied to the input terminals 180 and 181 is in phase with the reference voltage as applied to the input terminals 163 and 172 of the transformer 186 and a similar voltage will appear across the other resistor when the said error voltage is 180 degrees out of phase with said reference voltage.

When the phase of the error voltage is such that a rectified voltage appears across the resistor 189, a voltage drop will be produced across the resistors 191 and 192, the left end of the resistor 191 being negative, and the right end of the resistor 192 being positive. In other words, the left end of the resistor 191 will be negative with respect to ground potential while the other end of the resistor 192 will be positive with respect thereto. If the phase of the error voltage is just the opposite so that the rectified voltage appears across the resistor 190 then the right hand end of the resistor 192 will be negative with respect to ground potential while the left end of the resistor 191 will be positive with respect to ground potential.

The left end of the resistor 191 is connected to an output terminal 193 and the right end of the resistor 192 is connected to an output terminal 194. From the foregoing description it will be clear that the sign of the voltage appearing across the output terminals 193 and 194 will be dependent upon the phase of the error voltage across the terminals 180 and 181 with respect to the 400 cycle reference voltage across the terminals 163 and 172. Since zero bias is applied to the grids of the tubes 176, 177, 178, and 179 some current will flow through the tubes when their plates become positive even though no signal is applied to the grids thereof as when no error signal is applied to the terminals 180 and 181, thus indicating that the tracing finger 105 is at neutral or null position. Thus, with no voltage on the grids of any of the tubes, if the plates of the tubes 176 and 179 are now driven positive, current will flow through both of these tubes through the resistors 189 and 190. However, since the direction of current flow through the resistors is of opposite directions and since the currents are of equal value, the voltage appearing across each resistor will be equal and opposite so that the potential difference across the output terminals 193 and 194 will be zero.

During the next half cycle, the voltage on the plates will be reversed so that the plates of the tubes 177 and 178 will now be positive, and these tubes will therefore be rendered conductive. Here again, however, the voltage drops across the said resistors will be equal and opposite so that there will be no effective potential difference across the terminals 193 and 194. When an error voltage is applied to the primary winding of the transformer 182 due to departure of the core 63 and finger 105, Figure 8, from its null position, the current flow through the tubes whose grid is driven positive at the same time that its plate goes positive will be increased while the current flow through the remaining tubes whose plate is positive will be decreased due to the grid being driven negative by the signal from the transformer 182. Hence, an unbalance will be produced across the output terminals 193 and 194 which will become greater as the amplitude of the signal on the grids becomes greater.

From the foregoing it will be observed that when a signal is applied to the transformer 182 which is in phase with the 400 cycle reference voltage provided at the input terminals 163 and 172 of the transformer 186, a net potential difference will appear across the output terminals 193 and 194 which is proportional to the amplitude of the signal voltage. When the signal delivered to the transformer 182 is 180 degrees out of phase with the said 400 cycle reference voltage, a net potential difference of opposite polarity will appear across the output terminals 193 and 194 and again this potential difference will be proportional to the amplitude of the error signal as applied to the input terminals 180 and 181.

Power bridge amplifier

Since the power of the output from the phase sensitive rectifier, terminals 193 and 194 of Figure 8 is not sufficient to drive a mechanical transducer, it is amplified by a power bridge amplifier of the type disclosed in Figure 9. In this amplifier circuit four power-amplifier vacuum tubes 195, 196, 197, and 198 constitute the four ratio arms of the bridge, and any unbalance of the bridge circuit will be indicated by a current flow through a coil 199 connected between the cathodes of the tubes 195 and 197, the direction of current flow therein corresponding to the direction of unbalance of the bridge. The bridge circuit is normally in balance since the impedance of the tubes 196 and 198 is made equal or is also the impedance of the tubes 195 and 197. Therefore, there is no potential difference between the ends of the coil 199 under these conditions, no current will flow therethrough.

If, however, a potential difference appears across the input leads 193 and 194, this impedance balance will be upset since the lead 193 is connected to the grid of tube 196 while the lead 194 is connected to the grid tube 198. The plates of the tubes are connected by resistors 200 and 201 with the cathodes of the tubes 195 and 197 respectively. The plates of tubes 195 and 197 are both connected to the positive terminal of a conventional D. C. power supply 202, the negative terminal of which is connected to both cathodes of the tubes 196 and 198.

Two parallel paths of current flow are therefore provided between the positive and negative terminals of the power supply 202, one of these paths being through the tube 196, resistor 200 and tube 195; and the other being through the tube 198, resistor 201 and tube 197. The resistors 200 and 201 being of equal value, it will be seen that so long as the impedance of the tube 196 is equal to the impedance of the tube 198 and the impedance of the tube 195 is equal to the impedance of tube 197, the voltage at junction 203 will be equal to the voltage at junction 204 so that no current will flow through the coil 199.

Negative bias is applied to the grids of the tubes 196 and 198 by means of a voltage divider including a resistor 205 and a potentiometer 206 connected between the plate supply voltage lead and ground potential. The slider of the potentiometer 206 is connected with the cathodes of the tubes 196 and 198. In this way a positive potential of variable value may be applied to the cathodes of the tubes 196 and 198 whereby a negative bias will be provided since the grids of said tubes are grounded through resistors 191 and 192, Figure 8. The screen grids of tubes 196 and 198 are connected with a voltage tap on the power supply 202, so that the screens are supplied with a source of steady positive potential. As shown, this potential is applied through a potentiometer 207 connected between the screens of the tubes 196 and 198 so that the bridge may be brought into balance by adjustment of the slider thereof. In the case of the tubes 195 and 197, the screen grids thereof are connected to their respective plates so that these two tubes will operate as triodes.

Assuming now that the tracing finger 105 is deflected slightly above or below its null position by the pattern 42, Figures 1 and 2, a potential difference will appear across the leads 193 and 194 and assuming further that this direction is such that the grid of a tube 196 is rendered more positive while the grid of the tube 198 is rendered more negative, then the voltage drop across tube 196 will be reduced, the voltage drop across resistor 200 will be increased due to increased flow of current through tube 196 and decreased flow of current through tube 198. The bias on tube 195, therefore, will be increased due to the increased voltage drop across the resistor 200, and the voltage drop across tube 195 will also be increased. Hence the voltage of the junction point 203 will be reduced.

On the other hand, the more negative voltage on the grid of the tube 198 will increase the resistance of this tube, thereby reducing the voltage drop across resistor 201. The bias on tube 197 will thereby be decreased so as to reduce the impedance of this tube.

Hence the voltage of junction 204 will be increased. A voltage drop will therefore occur across the coil 199 and current will flow from right to left through said coil. If now it be assumed that the potential difference across the leads 193 and 194 be such that the grid of the tube 198 is rendered more positive while the grid of the tube 196 is rendered more negative, then the change in impedance of the tubes will be reversed and the voltage of the junction 203 will be increased while the voltage of the junction 204 will be decreased. Therefore, current will flow through the coil 199 from left to right or reversed from the previously described condition.

*Transducer mechanism*

Disposed within the base of the machine 20 is a control unit, Figure 13, consisting of a transducer 208 operated by the coil 199, a servo-valve 209 operated by the transducer and a variable differential transformer 185 controlled by the valve 209 so as to introduce feedback to the circuit. The transducer 208 comprises a loudspeaker type motor of the well-known electrodynamic type which includes a field coil 210 wound about a cylindrical core 211 which is bolted to an end plate 212.

Also bolted to the end plate 212 is a cylindrical casing 213 which supports an annular pole piece 214. Inasmuch as the core 211, end plate 212, casing 213, and a pole piece 214 are all formed of ferro magnetic material, excitation of the coil 210 from a suitable source of D. C. current will cause a magnetic field to be developed in the circular gap existing between the core 211 and the pole piece 214. Disposed within this gap is the rim of an aluminum cup 215 which carries the coil 199, Figure 9, which functions in the same manner as the K coil in an ordinary loudspeaker motor. The gap between the core 211 and the pole piece 214 is of sufficient width to permit the cup 215 with the coil 199 wound thereabout to move freely in the axial direction. Consequently when current flows through the coil 199 in one direction, the cup 215 will be urged in one direction whereas when the current flows through the coil 199 in a reverse direction the cup 215 will be urged in the opposite direction.

The cup 215 is secured by means of an insulating coupling to the left hand end of a valve plunger 216 which is slidable within a body 217 of servo-valve 209. The plunger 216 is unbiased and due to this balanced construction will remain in any position to which it is moved by the transducer 208. Also, the plunger 216 is kept "alive," that is, constantly vibrating at a high frequency and with a small amplitude by harmonic voltages appearing in the coil 199. The second harmonic, namely, 800 cycles per second, predominates and is chiefly responsible for the "jitter" introduced into the plunger 216. This high frequency vibration is desirable since it greatly reduces the static friction from the plunger 216 and renders it more responsive to signals from the transducer 208.

Mounted in the right hand end of the plunger 216 is a chuck 218 in which is secured a wire 219 which is connected at its opposite end to one of a pair of reeds 220 which supports the armature 221 of the differential transformer 185 for rectilinear movement. As shown in Figure 13, when the plunger 216 of the servo-valve 209 is centered, the armature 221 of the transformer 185 is likewise centered with respect to the poles thereof. However, when the plunger 216 is moved to either side of center the armature 221 will likewise be moved from its neutral position, thereby unbalancing the differential transformer 185.

Referring to Figure 8, where the differential transformer 185 is diagrammatically illustrated, it will be seen that the primary winding 222 of the transformer is supplied with 400 cycle alternating current from the terminal 171a through a coupling condenser 171b from the aforementioned oscillator shown in Figure 11 by means of a potentiometer 223. The slide of the potentiometer 223 is connected to one end of the primary winding 222, the other end of this winding being connected to ground potential as shown.

Secondary windings 183 and 184 of the differential transformer 185 are connected in phase opposition so that the voltage induced in one secondary will be 180 degrees out of phase with the voltage introduced in the other secondary. Consequently, when the armature 221 is in a centered position equal and opposite voltages will be introduced in the secondaries 183 and 184 which are connected in series with the primary winding of the transformer 182.

However, when the plunger 216 of the servo valve 209 is moved out of its centered position in response to a signal received by the coil 199 of the transducer 208 the armature 221 of the differential transformer will be moved in a direction to increase the coupling of the primary winding 222 and the secondary winding which is 180 degrees out of phase with the resultant voltage appearing across the terminals 180 and 181 of the transformer 182. The signal to the primary of the transformer 182 will thereby be balanced out and the current flow through the coil 199 of the transducer will be reduced to zero. As the tracing finger 105 returns to its "null" condition, the amplitude of the resultant voltage across the input terminals 180 and 181 will be reduced so that the bucking voltage from the differential transformer 185 will predominate. This will produce a signal in the transformer 182 which will produce a current flowing in the opposite direction through the coil 199 so as to move the plunger 216 in the opposite direction and return the armature 221 towards this centered position.

The potentiometer 223, Figure 8, provides sensitivity control for the apparatus, that is, it determines the extent of movement of the valve plunger 216 and armature 221 which is required to balance out the signal voltage delivered by the terminals 180 and 181 to the transformer 182. As the slider of the potentiometer 223 is moved toward the right, as viewed in Figure 8, the amplitude of the 400 cycle voltage supplied to the primary winding 222 will be increased, thereby reducing the movement of the armature 221 necessary to produce a bucking voltage of given amplitude. Hence for a signal voltage of given value from the differential transformer located in the tracing finger mechanism 52, Figure 3, a smaller movement of the valve plunger 216 will be sufficient to cancel out the signal when the slider of the potentiometer 223 is toward the right hand end of the potentiometer winding than when it is toward the left hand end thereof. This decreased movement of the valve plunger 216 necessary to balance out the given value of signal voltage will cause less rapid operation of the tracing mechanism to recenter the tracing finger 105 back to its null position. Hence the sensitivity of the control apparatus will be less with the slider set to the right hand end of the potentiometer 223 than with it set to the left hand end thereof.

The manner in which the servo-valve 209 operates to bring about a null condition of the tracing finger 105 may be understood by referring to Figure 7, which shows the hydraulic circuitry incorporated in the machine. The hydraulic motor 45, as shown in Figure 1, is connected to motor ports 224 and 225 of the servo-valve 209, also shown in Figures 7 and 13, by way of feed lines 226 and 227 respectively connected therebetween. The pressure port 228 is connected to motor port 229 of an index valve 230 by feed line 231 connected therebetween through a series connected check valve 232. Exhaust ports 233 and 234 of the valve 209 are connected together and then returned to reservoir 235 by way of exhaust line 236 connected therebetween. A pressure switch 1PS is provided and is connected to the feed line 231 in such a manner that its contacts will be closed when there is no pressure in line 231 and opened when there is pressure in line 231. Pressure port 237 of the index valve 230 is connected to a pressure source 238 by way of feed line 239 connected therebetween. Constant pressure is maintained in the line 239 by action of a parallel connected pressure regulating valve 240.

Therefore, it can be seen that when the plunger 241 of the index valve 230 is at its normal position to the left as shown, during the tracing operation, hydraulic pressure will be supplied by the pressure source 238 to the pressure port 228 of the valve 209 by way of feed line 239, pressure port 237, motor port 229, check valve 232, and feed line 231. Thus, if current flows through the coil 199, Figure 9, say to the right, the plunger 216 of the valve 209 will be moved to the right, thus connecting pressure port 228 to motor port 225 and also connecting motor port 224 to exhaust port 234, and thus the motor 45 will rotate in a clockwise direction. Conversely, if current is reversed and flows through the coil 199 to the left, the plunger 216 of the valve 209 will be moved in the opposite direction or to the left, thus connecting pressure port 228 to motor port 244 and also connecting exhaust port 233 to motor port 225, and thus the motor 45 will rotate in an opposite or counterclockwise direction.

Therefore, with reference to Figure 1, it can now be seen that as the tracing finger 105 is in contact with the pattern 42, any change in the angularity of the pattern tooth will cause deflection of the tracing finger 105 either above or below its normal or null position, and thus an error signal will be transmitted to the motor 45 to operatively cause said motor to rotate the pattern 42 in such a direction so as to cause the tracing finger 105 to be restored to its null position, which can in a sense be considered a "null seeking" servo-loop. Thus, as constant pressure will be applied on the finger 105 by the pattern 42 at all times, it is now obvious that if the table 23 is traversed, said pattern 42 will be rotated by the motor 45 in such a direction as to maintain the finger 105 in a neutral position. Since the workpiece 41 is directly coupled to the pattern 44, the workpiece 41 will rotate in synchronism with said pattern 42 and will be traversed with respect to the grinding wheel 27 to complete the grinding operation.

Means have been provided to index the cutter 41 to present automatically the next tooth thereof to the grinding wheel 27 after completion of the first grinding operation. With reference again to Figure 7, said means consists essentially of an index metering cylinder 242 controlled by the indexing control valve 230. Motor port 243 of the valve 230 is connected to pressure port 244 of cylinder 242 by way of feed line 245 connected therebetween. Exhaust ports 246 and 247 of the valve 230 are connected together and returned to the reservoir 235 by exhaust line 248 connected therebetween, whereas exhaust port 248A of the cylinder 242 is returned to reservoir 235 by way of exhaust line 236 connected therebetween. Port 248' of the cylinder 242 is connected to the feed line 231 through a series connected hydraulic resistance 249.

Normally, piston 250 in the cylinder 242 is normally held in a position to the left against a positive stop 351 by the pressure in line 231. Therefore, if the piston 241 of the valve 230 is moved to the right, hydraulic pressure from the source 238 will be delivered to the pressure port 244 of the cylinder 242 by way of line 239, pressure port 237, motor port 243 and feed line 245, and thus the piston 250 will be moved to the right, thereby forcing a measured amount of hydraulic fluid into the feed line 231 through the resistance 249 to index motor 45. During this indexing procedure of the work 41, the tracing finger 105 will have run off the end of the pattern 42, and therefore, will be released so as to cause current to flow through the coil 199, Figure 9, say to the right, causing the plunger 216 of the valve 209 to move to the right. Therefore, the said measured amount of hydraulic fluid as supplied to the feed line 231 by the metering cylinder 242 will flow to the motor 45 to cause clockwise rotation thereof to index the workpiece 41 to the next tooth to be ground.

The distance at which the motor 45 is rotated during indexing is determined by the volume of fluid ejected into the feed line 231 which, in turn, is determined by adjustment of the positive stop 351. The point at which the positive stop 351 will be adjusted, thus determining the volume of fluid to be supplied to the motor 45, will depend on the pitch of the teeth of the cutter 41 to be ground.

In order to operatively move the plunger 241 of the valve 230 to the right to effect indexing, after each grinding operation, means have been provided consisting essentially of two solenoids SOL-2 and SOL-3 operatively connected to either end of the plunger 241, so that if SOL-2 is energized and SOL-3 is deenergized, the plunger 241 will be held in a position to the left as shown, but if SOL-3 is energized and SOL-2 is deenergized, the plunger 241 will be moved to the right and be held in that position as long as SOL-3 is energized.

*Thyratron circuitry*

Therefore, thyratron circuit means, such as that disclosed in Figure 10, has been provided to cause selective energization of the solenoids SOL-2 and SOL-3 and consists essentially of two conventional thyratron vacuum tubes 251 and 252. The primary winding 254 of power transformer 255 is connected to a source of 60 cycle A. C. voltage as supplied to terminals 256 and 257 and is thus energized thereby. The ends of the center-tapped secondary winding 258 are connected to the plates of the tubes 251 and 252 respectively so that the voltage on each plate will be 180 degrees out of phase with respect to the other. The center tap of the secondary 258 is returned to ground potential through resistor 259 and parallel connected relay coil 5CR and condenser 260 series connected therebetween. The cathodes of the said tubes are returned to ground potential whereas their respective control grids are returned to the negative terminal of a rectifier power source 261 through their respective grid resistors 262 and 263, therefore maintaining a constant negative bias thereon.

The rectifier power source 261 is supplied with A. C. from a secondary winding 264 of the transformer 255 and is essentially of a conventional voltage-doubler bridge type consisting of two selenium rectifiers 265 and 266 and two condensers 267 and 268 connected to form a series loop. A load resistor or potentiometer 269 is connected across the upper end of the bridge 261 and returned to ground potential, the lower end of the bridge also being returned to ground potential. The screen grids of the tubes 251 and 252 are connected to the upper end of the potentiometer 269 and thus a constant negative bias is maintained thereon. The negative bias on the control grids is determined by the setting of the slider of the potentiometer 269 and thus the thyratron tubes 251 and 252 may be set to "fire" or conduct at any predetermined value of input signal. Therefore, the control grids of the tubes 251 and 252 are returned to an input terminal 270 through series connected coupling condensers 271 and 272 respectively.

The input terminal 270 is therefore connected to the cathode of the tube 197 of the bridge amplifier as shown in Figure 9. Therefore, as the negative bias on the thyratron tubes 251 and 252 is set at a predetermined value by the setting of the slider of the potentiometer 269, the said tubes will not conduct when their respective plates are driven positive. If the voltage appearing at terminal 270 suddenly goes positive to some predetermined value, the tubes 251 and 252 will alternatively conduct and thus will energize the relay coil 5CR. Normally, the thyratron tubes 251 and 252 are adjusted to conduct when the tracing finger 105 is approximately .030" or more underdeflected. Conversely, when the positive voltage at terminal 270 is decreased to some predetermined value, the tubes 251 and 252 will be cut-off and therefore cease to conduct, and thus the relay coil 5CR will be deenergized.

A more complete understanding of the foregoing description may be had by analysis of the control circuitry as shown in Figure 12, described in connection with a description of an actual working condition.

It may be well to note at the outset that for the sake of convenience of description and to enhance the ease of comprehension of the electrical circuitry, as shown in Figure 12, it will be noted that a vertical scale has been provided and located at the right edge thereof in a manner to provide horizontal consecutively numbered reference lines from A1 to A18. Each electrical component hereinafter mentioned will be located on one of said reference lines and will so be referred.

It will be assumed that the pattern 42 and work 41 have been properly mounted in the machine as shown in Figure 1, whereas the tracing finger 105 and grinding wheel 27 have been properly adjusted in their respective positions relative to the pattern and work; the tracing finger 105 being in engagement with the extreme left end of the pattern tooth and biased to a null position and the grinding wheel being in contact with a corresponding cutter tooth and positioned also at the extreme left end of the cutter 41 as shown.

Therefore, with reference again to Figure 12, when the main power switch SW–1 on line A1 is closed, the primary winding of the power transformer T–1 also on line A1 will be energized from the main A. C. power lines LL1 and LL2 connected thereto. The secondary winding of the transformer T–1 connects to and activates the feed lines L1 and L2.

Therefore, as the cycle start push button PB–1 on line A2 is actuated, the relay coil 6CR will be energized to close contacts 6CR–2 and 6CR–3 on line A3 to activate the feed lines L3 and L4.

As the feed lines L3 and L4 are energized, relay coils 1CR on line A3, 2CR on line A5, 3CR on line A7, and the index valve coil SOL–2 on line A11, also shown in Figure 7, will be energized.

When the relay coil 1CR is energized, contacts 1CR–1 on line A4 close to maintain the coil 2CR energized, and contacts 1CR–2 and 1CR–3 on line A17 close to energize the armature of the table traverse motor 31, Figure 1, to feed the table 23 thus the pattern 42 and cutter 41 to the left. During this feeding movement, the hydraulic motor 45 will twist the pattern 42 and cutter 41 so as to cause the tracing finger 105 to follow the helical tooth of the pattern 42 and also maintain the tooth of the cutter 41 in a predetermined position relative to the periphery of the grinding wheel 27.

When the relay coil 2CR on line A5 is energized, contact CR2 on line A13 is closed.

When the relay coil 3CR on line A7 is energized, contacts 3CR–1 on line A8, contacts 3CR–2 and 3CR–3 on line A17 do not open as the said contacts are provided with an interlock such that the said contacts can only be open upon energization of the relay coil 4CR on line A9 as will later become more apparent.

When the index valve coil SOL–2 on line A11 is energized, the index valve plunger 241 will be held to the left as shown in Figure 7.

Therefore, the table traverse motor 31 will continue to feed the work table 23 to the left until a limit switch 2LS, mounted on the cross slide 22, is actuated by a dog 300 carried by the table 23.

When the limit switch 2LS is actuated, its contacts 2LS–1 on line A6 open but the coil 2CR remains energized; contacts 2LS–2 on line A8 open to deenergize the relay coil 3CR; and contacts 2LS–3 on line A9 close to energize the relay coil 4CR.

When the limit switch 2LS is actuated, its contacts 2LS–1 on line A6 open, but the coil 2CR remains energized; contacts 2LS–2 on line A8 open to deenergize the relay coil 3CR; and contacts 2LS–3 on line A9 close to energize the relay coil 4CR.

The relay coil 3CR on line A7 is deenergized to permit its contacts 3CR–1 on line A8, 3CR–2 and 3CR–3 on line A17 to now be opened by the relay coil 4CR.

Therefore, when the relay coil 4CR on line A9 is energized, its contacts 4CR–1 on line A8, 4CR–2 on line A16, and 4CR–3 on line A18 close, and in addition, the relay coil 4CR releases the interlock on the coil 3CR and therefore the contacts 3CR–1 on line A8, and 3CR–2 and 3CR–3 on line A17 open simultaneously. Therefore, it can be seen that since the polarity of the voltage across the armature of the table traverse motor 31 has been reversed, the armature will reverse direction of rotation to start to feed the table 23 to the right.

The dog 300 is positioned on the table 23 at such a distance and such a manner to cause the tracing finger 105 to run off the right end of the pattern 42 and thus become underdeflected so that the thyratron on line A11 also shown in Figure 10, will fire, thus energizing the relaty coil 5CR.

When the coil 5CR is energized, contacts 5CR–1 on line A11 open to deenergize the index valve coil SOL–2 and close contacts 5CR–2 on line A12 to energize the index valve coil SOL–3 which causes the index valve plunger 241, thence the plunger 250, to move to the right to effect indexing of the pattern 42 and cutter 41 as has heretofore been fully described. At the beginning of the indexing, the pressure switch 1PS on line A3, also shown in Figure 7, is opened to deenergize the relay coil 1CR to open contacts 1CR–2 and 1CR–3 on line A17 to stop rotation of the table traverse motor 31 until the indexing cycle is completed. When the indexing is completed and the pressure in the line 231 drops to zero, the pressure switch 1PS will close to reenergize the relay coil 1CR to close contacts 1CR–2 and 1CR–3 on line A17 to reenergize the armature to effect feed of the work table 23 to the right.

When the limit switch 2LS is released by the dog 300, its contacts 2LS–1 on line A6 close; contacts 2LS–2 on line A8 close; and contacts 2LS–3 on line A9 open, but the coil 4CR remains energized.

When the next pattern tooth engages the tracer finger 105, it will be deflected to its normal or null position to cut off the thyratron on line A11, also shown in Figure 10, which deenergizes the relay coil 5CR on line A10 which closes contacts 5CR–1 on line A11 to energize the index valve coil SOL–2 and opens cotacts 5CR–2 on line A12 to deenergize the index valve coil SOL–3 and thus the index valve plunger 241; thence the plunger 250 will move to the left as shown.

Therefore, the work table 23 will continue to feed to the right until a limit switch 1LS, mounted on the cross slide 22, is actuated by a dog 301 carried by the table 23.

When the limit switch 1LS is actuated, its contacts 1LS–1 on line A6 open, but the coil 2CR remains energized, contacts 1LS–2 on line A7 close to energize the relay coil 3CR, and contacts 1LS–3 on line A8 open to deenergize the relay coil 4CR. The relay coil 4CR on line A9 is deenergized to permit its contacts 4CR–1 on line A8, and contacts 4CR–2 on line A16, and contacts 4CR–3 on line A18 to be opened by the relay coil 3CR.

Therefore, when the relay coil 3CR on line A7 is energized, its contacts 3CR–1 on line A8, 3CR–2 and 3CR–3 on line A17 close, and, in addition, the relay coil 3CR releases the interlock on the coil 4CR and therefore the contacts 4CR–1 on line A8, 4CR–2 on line A16 and contacts 4CR–3 on line A18 open simultaneously. Therefore, it can be seen that since the polarity of the voltage across the armature of the table traverse motor 31 has again been reversed, the armature will again reverse directional rotation to start to feed the work table 23 to the left.

The dog 301 is also positioned on the table 23 at such a distance and in such a manner to cause the tracing finger 105 to run off the left end of the pattern 42 and then as the tracing finger 105 is again undeflected at this point the thyratron on line A10, also shown in Figure 10, will again fire, thus energizing the relay coil 5CR on line A10. When the coil 5CR is energized, contacts 5CR–1 on line A11 open to deenergize the index valve coil SOL–2 and close contacts 5CR–2 on line A12 to energize the index valve coil SOL–3 which causes index valve plunger 241, thence the plunger 250, to move to the right to effect indexing of the pattern 42 and the cutter 41. At the begining of the indexing cycle the pressure switch 1PS on line A3, also shown in Figure 7, is open to deenergize the relay coil 1CR to open contacts 1CR–2 and 1CR–3 on line A17 to stop the table traverse motor 31 until the indexing cycle is completed.

When the indexing is completed and the pressure in the line 231 drops to zero, the pressure switch 1PS on line A3 will close to reenergize the relay coil 1CR to close contacts 1CR–2 and 1CR–3 on line A17 to energize the armature to effect feed of the work table 23 to the left.

When the limit switch 1LS is released by the dog 301 its contacts 1LS–1 on line A6 close, contacts 1LS–2 on line A7 open, but the relay coil 3CR remains energized, and contacts 1LS–3 on line A8 close.

When the tracing finger 105 comes in contact with the end of the pattern tooth, the said finger 105 will again be deflected to its normal or null position to cut off the thyratron on line A11, also shown in Figure 10, which deenergizes the relay coil 5CR on line A10, which closes contacts 5CR–1 on line A11 to energize the index valve coil SOL–2 and opens contacts 5CR–2 on line A12 to deenergize the index valve coil SOL–3 and thus the index valve plunger 241, thence the plunger 250 will move to the left as shown in Figure 7.

Therefore, the work table 23 will continue to feed to the left until the limit switch 2LS mounted on the cross slide 22 is again actuated by the dog 300 carried by the table 23 to repeat the cycle of operation as has heretofore been fully described.

Therefore, after the desired number of cycles of grinding operation have been completed, the stop push button PB2 on line A2 may be opened by a dog 325 suitably placed on the machine as by mounting on the end of the rotating pattern 42 in any conventional manner or may be maually operated as so desired. As the stop push button PB–2 is actuated, the coil 6CR on line A2 will be deenergized which releases latching contacts 6CR–1 on line A3 and the contacts 6CR–2 and 6CR–3 on line A3 open to deactivate the A. C. feed lines LS and L4, and all coils will be deenergized and their respective contacts will be restored to their original deenergized position as shown in Figure 12, thus completing a complete cycle of operation, and thus the cutter 41 may be removed and a different cutter mounted in its stead.

Having thus fully described a complete automatic, pattern controlled cutter grinder, which is claimed as new and improved and desired to secure by United States Letters Patent is:

1. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger for engagement with a helical tooth of a mounted pattern, and a motor connected to said cutter and pattern mounting means for effecting synchronous angular rotation thereof, control means associated with said motor to control the operation of the motor and operative connections between the tracing mechanism, and said control means whereby said motor is automatically controlled by said tracing mechanism during movement of the table to effect synchronous angular rotation of said pattern and cutter mounting means to automatically maintain engagement between a mounted pattern and the tracing finger.

2. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table, the combination of means for mounting a helical toothed cutter and a corresponding helical toothed pattern coaxially between said headstock and tailstock, tracing mechanism mounted on said base including a tracing finger for engagement with a helical tooth of said pattern, reversible power means to effect synchronous angular movement of said pattern and work to effect engagement, and transducer means operable by said tracing mechanism during feeding of said table to energize said last-named power means to impart rotation to said cutter to automatically maintain the helical cutting edge of the cutter tooth in a predetermined position relative to the periphery of said grinding wheel.

3. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger in engagement with a helical tooth of said pattern biased to a null position, reversible power means for feeding said table traversely of said grinding wheel, transducer means controlled by said tracing mechanism responsive to deviations from said null position during the feeding movement to effect angular twisting movement of said pattern to automatically maintain engagement thereof with said tracing finger and simultaneously maintaining engagement of the helical cutting edge of the cutter tooth in contact with the periphery of the grinding wheel at a predetermined relative position.

4. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger in engagement with a helical tooth of said pattern biased to a null position, reversible power means for feeding said table traversely of said grinding wheel to effect a cycle of grinding operation in either direction, transducer means controlled by said tracing mechanism responsive to deviations from said null position during the feeding movement to effect angular twisting movement of said pattern to automatically maintain engagement thereof with said tracing finger and simultaneously maintaining engagement of the helical tooth of the cutter in contact with the grinding wheel during each cycle of grinding operation, means to automatically index said pattern and cutter to the next successive tooth respectively upon completion of each cycle of grinding operation, means trip operable by said table to energize said indexing means and simultaneously reversing said traversing means, and means trip operable by said pattern to deenergize said traversing means upon completion of a predetermined number of cycles of grinding operation.

5. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger for engagement with a helical tooth of a mounted pattern, and reversible hydraulic motor means automatically controlled by said tracing mechanism during movement of the table to effect synchronous angular rotation of said pattern and cutter mounting means to automatically maintain engagement between a mounted pattern and the tracer finger.

6. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table, the combination of means for mounting a helical toothed cutter and a corresponding helical toothed pattern coaxial between said headstock and tailstock, tracing mechanism mounted on said base including a tracing finger for engagement with a helical tooth of said pattern, reversible hydraulic motor means to effect synchronous angular movement of said pattern and work, and transducer means operable by said tracing mechanism during feeding of the table to energize said hydraulic motor means to twist said cutter to automatically maintain the helical cutting edge of the cutter tooth in a predetermined position relative to the periphery of said grinding wheel.

7. In a cutter grinder for automatically sharpening helical cutter teeth, having a base, a work table slidably mounted on said base, a grinding wheel rotatably mounted on said base adjacent to said work table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger for engagement with a helical tooth of said pattern biased to a null position, reversible power means for feeding said table traversely of said grinding wheel, reversible hydraulic motor means to effect angular movement of said pattern and cutter, transducer means controlled by said tracing mechanism responsive to deviations from said null position during table feeding movement to twist said pattern to automatically maintain engagement thereof with said tracing finger and simultaneously to maintain engagement of the helical cutting edge of the cutter tooth in contact with the periphery of the grinding wheel at a predetermined relative position.

8. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger in engagement with a helical tooth of said pattern biased to a null position, reversible power feeding means for feeding said table traversely of said grinding wheel to effect a cycle of grinding operation in either direction, hydraulic motor means to effect angular movement of said pattern and work, transducer means controlled by said tracing mechanism responsive to deviations from said null position during table feeding movement to control said hydraulic motor means to twist said pattern to automatically maintain engagement thereof with said tracing finger and simultaneously to maintain engagement of the helical tooth of the cutter in contact with the grinding wheel during each cycle of grinding operation, means to automatically index said pattern and cutter to the next successive tooth respectively on completion of each cycle of grinding operation, means trip operable by said table to energize said indexing means and simultaneously to reverse said traversing means, and means trip operable by said pattern to deenergize said traversing means upon completion of a predetermined number of cycles of grinding operation.

9. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means oppositely mounted on opposite ends of said table for movement therewith, the combination of means for mounting a helical toothed cutter and a corresponding helical toothed pattern coaxially between said headstock and tailstock, tracing mechanism mounted on said base including a tracing finger for engagement with a helical tooth of said pattern, reversible hydraulic motor means to effect rotational movement of said pattern and cutter, valve means for said hydraulic motor means, electrical means controlled by said tracing mechanism for shifting said valve means during movement of the table to effect synchronous angular rotation of said pattern and cutter to automatically maintain engagement between said pattern and tracer.

10. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table, the combination of means for mounting a helical toothed cutter and a corresponding helical toothed pattern coaxially between said headstock and tailstock, tracing mechanism mounted on said base including a tracing finger for engagement with a helical tooth of said pattern, reversible hydraulic motor means to effect synchronous angular movement of said pattern and work to effect engagement, valve means for said hydraulic motor means, electrical means controlled by said tracing mechanism for shifting said valve means during feeding movement of the table to impart rotation to said cutter to automatically maintain the helical cutting edge of the cutter tooth in a predetermined position relative to the periphery of said grinding wheel.

11. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger in engagement with a helical tooth of said pattern biased to a null position, reversible power means for feeding said table traversely of said grinding wheel, hydraulic motor means to effect synchronous angular movement of said pattern and work, valve means for said hydraulic motor means, electrical means controlled by said tracing means for shifting said valve means in response to deviation from said null position during table feeding movement to effect twisting movement of said pattern to automatically maintain engagement thereof with said tracing finger and, in addition, to simultaneously maintain engagement of the helical cutting edge of the cutter tooth with the periphery of the grinding wheel at a predetermined relative position.

12. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger in engagement with a helical tooth of said pattern biased to a null position, reversible power means for feeding said table traversely of said grinding wheel to effect a grinding cycle in either direction, hydraulic motor means to affect angular movement of said pattern and work, valve means for said hydraulic motor means, electrical means controlled by said tracing means for shifting said valve means in response to deviation from said null position during table feeding to effect twisting movement of said pattern to automatically maintain engagement thereof with said tracing finger and, in addition, simultaneously maintaining engagement of the helical cutting edge of the cutter tooth in contact with the periphery of the grinding wheel at a predetermined relative position during each grinding cycle, means to automatically index said pattern and cutter to the next successive tooth respectively upon completion of each cycle, means trip operable by said table to energize said indexing means and to simultaneously reverse said traversing means, and means trip operable by said pattern to deenergize said traversing means upon completion of a predetermined number of grinding cycles.

13. In a cutter grinder for automatically sharpening helical cutter teeth having a base, a work table slidably mounted on said base, a grinding wheel rotatably mounted on said base adjacent to said table, means to rotate said grinding wheel, and a headstock and tailstock means oppositely mounted on either end of said table for movement therewith, the combination of means for mounting a helical toothed cutter and a corresponding helical toothed pattern coaxially between said headstock and tailstock, tracing mechanism mounted on said base including a tracing finger for engagement with a helical tooth of said pattern, hydraulic motor means to effect unidirectional rotational movement of said pattern and cutter, valve means for said hydraulic motor means, electronic means controlled by said tracing mechanism for opening and closing said valve means during movement of said table to effect synchronous unidirectional twisting movement of said pattern and cutter to automatically maintain engagement between said pattern and tracer.

14. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table, the combination of means for mounting a helical toothed cutter and a corresponding helical toothed pattern coaxially between said headstock and tailstock, tracing mechanism mounted on said base including a tracing finger for engagement with a helical tooth of said pattern, hydraulic motor means to effect unidirectional synchronous rotation of said pattern and work to effect engagement, valve means for said hydraulic motor means, electronic means controlled by said tracing mechanism for opening and closing said valve means during feeding movement of the table to impart unidirectional twisting movement to said cutter to automatically maintain the helical cutting edge of the cutter tooth in a predetermined position relative to the periphery of said grinding wheel.

15. In a cutter grinder for automatically sharpening helical cutter teeth having a base, a work table slidably mounted on said base, a grinding wheel rotatably mounted on said base adjacent to said table, means to rotate said grinding wheel, and a headstock and tailstock means mounted on opposite ends of said table for movement therewith, the combination of means for mounting a helical toothed cutter and a corresponding helical toothed pattern coaxially between said headstock and tailstock, tracing mechanism mounted on said base including a tracing finger in engagement with a helical tooth of said pattern biased to a null position, power means for feeding said table traversely of said grinding wheel, hydraulic motor means to effect synchronous rotation of said pattern and work, valve means for said hydraulic motor means, electronic means controlled by said tracing mechanism for opening and closing said valve means in response to deviation from said null position during table feeding movement to effect unidirectional twisting movement of said pattern to automatically maintain engagement thereof with said tracing finger, and, in addition, to simultaneously maintain engagement of the helical cutting edge of the cutter tooth with the periphery of the grinding wheel at a predetermined relative position.

16. In a cutter grinder for automatically sharpening helical cutter teeth, having a base, a work table slidably mounted on said base, a grinding wheel rotatably mounted on said base adjacent to said table, means to rotate said grinding wheel, and a headstock and tailstock means mounted on opposite ends of said table, the combination of means for mounting a helical toothed cutter and a corresponding helical toothed pattern coaxially between said headstock and tailstock, tracing mechanism mounted on said base including a tracing finger in engagement with a helical tooth of said pattern biased to a null position, reversible power means for feeding said table traversely of said grinding wheel to effect a cycle of grinding operation in either direction, hydraulic motor means to effect unidirectional synchronous rotational movement of said pattern and work, valve means for said hydraulic motor means, electronic means controlled by said tracing mechanism for opening and closing said valve means in response to deviation from said null position during table feeding movement to effect twisting movement of said pattern to automatically maintain engagement thereof with said tracing finger and, in addition, to simultaneously maintain engagement of the helical cutting edge of the cutter tooth in contact with the periphery of the grinding wheel at a predetermined relative position during each cycle of grinding operation, means to automatically index said pattern and work to the next successive tooth respectively upon completion of each cycle of grinding operation, means trip operable by said table to energize said indexing means and to simultaneously reverse said traversing means, and means trip operable by said pattern to deenergize said traversing means upon completion of a predetermined number of cycles of grinding operation.

References Cited in the file of this patent

UNITED STATES PATENTS

| | | |
|---|---|---|
| 1,159,739 | Bock | Nov. 9, 1915 |
| 1,275,218 | Calkins | Aug. 13, 1918 |
| 1,899,654 | Ward | Feb. 28, 1933 |
| 1,976,818 | Ward | Oct. 16, 1934 |